(12) United States Patent
Siebert et al.

(10) Patent No.: US 8,096,714 B2
(45) Date of Patent: Jan. 17, 2012

(54) STENOGRAPHIC KEYBOARD DEVICE PROVIDING EXTENDED SET OF KEYS AND METHOD FOR ELECTRONICALLY ADJUSTING KEY DEPTH SENSITIVITY

(75) Inventors: David Siebert, Stuart, FL (US); Portia Seely, Stuart, FL (US)

(73) Assignee: Advantage Technology and Innovations, Inc., Stuart, FL (US)

( * ) Notice: Subject to any disclaimer, the term of this patent is extended or adjusted under 35 U.S.C. 154(b) by 596 days.

(21) Appl. No.: 11/930,895

(22) Filed: Oct. 31, 2007

(65) Prior Publication Data
US 2008/0107465 A1  May 8, 2008

Related U.S. Application Data

(60) Provisional application No. 60/855,547, filed on Oct. 31, 2006.

(51) Int. Cl.
G06F 3/023 (2006.01)
(52) U.S. Cl. .............. 400/94; 400/91; 400/472; 200/5 R
(58) Field of Classification Search .................... 400/91, 400/92, 93, 94
See application file for complete search history.

(56) References Cited

U.S. PATENT DOCUMENTS

| | | | |
|---|---|---|---|
| 2,923,393 A | 2/1960 | Berkelmans | |
| 3,557,927 A | 1/1971 | Wright | |
| 3,644,888 A | 2/1972 | Marino | |
| 3,693,184 A | 9/1972 | Maling | |
| 3,832,733 A | 8/1974 | Eldridge | |
| 3,892,915 A | 7/1975 | Budworth et al. | |
| 3,964,062 A | 6/1976 | Flagg | |
| 4,195,545 A | 4/1980 | Nishimoto | |
| 4,205,351 A | 5/1980 | Michals | |
| 4,379,968 A | 4/1983 | Ely | |
| 4,415,283 A | 11/1983 | Smith | |
| 4,628,785 A | 12/1986 | Buchla | |
| 4,765,764 A | 8/1988 | Lefler | |
| 5,466,072 A * | 11/1995 | McCready | ..................... 400/91 |
| 6,051,767 A | 4/2000 | Masubuchi | |
| 6,204,839 B1 | 3/2001 | Mato, Jr. | |
| 6,525,717 B1 | 2/2003 | Tang | |
| 7,035,804 B2 | 4/2006 | Saindon | |
| 7,403,375 B1 | 7/2008 | Chvojcsek et al. | |
| 7,572,078 B2 | 8/2009 | Siebert | |
| 2002/0049595 A1 | 4/2002 | Bennett | |
| 2005/0201807 A1 | 9/2005 | Siebert | |

(Continued)

FOREIGN PATENT DOCUMENTS

JP  61129519  5/1986

(Continued)

*Primary Examiner* — Daniel J Colilla
(74) *Attorney, Agent, or Firm* — Mayback & Hoffman, P.A.; Gregory L. Mayback; Rebecca A. Tie

(57) ABSTRACT

A device and method for determining key registration settings in a stenographic device, includes providing a plurality of keys making up a standard stenographic keyboard, each key having a resting position, a depressed position, and a range of depression positions between the resting position and the depressed position, receiving information indicating a depression depth of a key on the standard stenographic keyboard, and a processor communicatively coupled to a display and the plurality of keys, the processor operable to cause the display to graphically show, for at least one of the keys, a depression indicator of a current one of the depression positions.

18 Claims, 11 Drawing Sheets

U.S. PATENT DOCUMENTS

| | | |
|---|---|---|
| 2008/0107465 A1 | 5/2008 | Siebert |
| 2008/0297475 A1* | 12/2008 | Woolf et al. .................. 345/163 |
| 2009/0119063 A1 | 5/2009 | Siebert |
| 2011/0110696 A1* | 5/2011 | Siebert ............................ 400/91 |
| 2011/0116855 A1* | 5/2011 | Siebert ........................... 400/482 |

FOREIGN PATENT DOCUMENTS

| | | | | |
|---|---|---|---|---|
| JP | 61129519 A | * | 6/1986 | |
| JP | 02017729 | | 1/1990 | |
| JP | 02017729 A | * | 1/1990 | |
| JP | 05323988 | | 12/1993 | |
| JP | 05323988 A | * | 12/1993 | |
| JP | 09305286 | | 11/1997 | |
| JP | 09305286 A | * | 11/1997 | |
| JP | 2003076480 | | 3/2003 | |
| JP | 2003076480 A | * | 3/2003 | |
| JP | 2006156170 A | * | 6/2006 | |
| JP | 20060156170 | | 6/2006 | |

\* cited by examiner

STENOGRAPHIC KEYBOARD DEVICE PROVIDING EXTENDED SET OF KEYS AND METHOD FOR ELECTRONICALLY ADJUSTING KEY DEPTH SENSITIVITY

CROSS-REFERENCE TO RELATED APPLICATION

This application claims the benefit under 35 U.S.C. §119(e) of U.S. Provisional Application No. 60/855,547, filed Oct. 31, 2006, and is related to U.S. patent application Ser. No. 11/077,786, filed Mar. 11, 2005, which application claims the benefit under 35 U.S.C. §119(e) of U.S. Provisional Application No. 60/552,569, filed Mar. 12, 2004, the complete disclosures of which are hereby incorporated by reference herein in their entirety.

BACKGROUND OF THE INVENTION

Field of the Invention

The invention lies in the field of keystroke devices. In particular, the invention is in the field of computer or stenographic keyboards and methods and software for interpreting keystrokes of these keyboards.

Various keystroke devices exist in the art. The most prevalent keystroke device is a computer keyboard. The keys of a standard computer keyboard are merely switches electronically indicating only a depressed state. Therefore, no signal is output or indicated by the keyboard when a keyboard is at rest, and a signal corresponding to depressed key(s) is output or indicated only when at least one key is depressed sufficiently far to "set off" the switch of that key or the switches of that set of keys.

A typewriter also has a keyboard, which can be mechanical and/or electronic. Like the computer keyboard, actuation (e.g., depression) of a key is intended to print a character. In electronic typewriters, when a key is actuated sufficiently far, a signal is sent to a processor to have the corresponding key(s) printed on the typing medium (e.g., paper). Mechanical typewriters are similar to electronic typewriters, but with one significant difference. Mechanical typewriters connect the key of the keyboard directly to the hammer containing the corresponding character to be printed on the page. Such a connection typically places the key at the end of a lever connected to a fulcrum and, when the lever is depressed at a proximal end, the distal end of the lever forcibly contacts or causes a hammer to pivot its distal end towards the page. A printing ribbon is disposed between the page and the end of travel of the hammer and a character formed at the end of the hammer is printed on the paper because the raised character presses the printing ribbon against the page. Because such an assembly is a mechanical connection dependent upon the pressure imparted by the user, the hammer can hit the page with varying degrees of force. A relatively hard contact produces a clearly printed character on the page. In contrast, a relatively soft contact may produce a lightly printed character, which also can be referred to as a "shadow." For mechanical typewriters, it is more desirable to have clearly printed characters than to have shadow characters. Therefore, improvements were made over the history of mechanical typewriters to guarantee relatively uniform contact between the hammer and the page, which improvements were, thereafter, incorporated into most electronic typewriters.

Another keystroke device can be found on stenographic devices. The most modern stenographic devices are entirely electronic and virtually immediately translate the stenographic key actuations into an accurate written representation of the spoken word. These modern devices are analogous to the electronic typewriters and computer keyboards in that a specific actuation of a key or set of keys will cause a clear printing or storage of the corresponding character or set of characters. Insufficient depression of a key(s) will not generate any output. Alternatively, depression of a set of keys (which is common for stenographic dictation) where one or more keys is sufficiently actuated but one or more other key(s) is insufficiently actuated will generate an output that does not correspond to the stenographers' intended output. Thus, the stenographer or computer associated with the stenographic device might not be able to accurately translate the inadequately actuated key(s) depending upon what was actually output to the paper or the electronically stored file.

The earlier stenographic devices provided an advantage over the modern stenographic devices. The older devices gave a stenographer some ability to determine a correct output from an incorrect input because these older mechanical devices printed the output on the paper in varying degrees of lightness. Stenographers refer to a lightly printed output as "shadow" output. So, if an intended output was lightly printed on the stenographic paper, that stenographer might have been able to determine what was intended during the original dictation and correctly translate the spoken word in the final transcript. Modern stenographic devices, however, are not able to electronically understand or store shadow output. If the stenographer does not actuate a key adequately, then no output is generated. And, if keys of a set of keys are actuated in varying degrees, then incorrect output is transcribed.

Prior art stenographic keyboards all have a rear and middle row of ten keys each and a front row of four keys, the latter being closer to the stenographer than the former. In such machines, the keys of the front row correspond to vowels. These keys are, in the prior art, at a level lower (closer to ground) than the two rear rows.

Some prior art machines are illustrated in FIGS. 1 to 6. FIGS. 1 and 2 are views of a stenographic writer manufactured by the Stenograph Corporation and called a Mira. This keyboard does not include the keys to the left of the two rear rows mentioned above. As is clear from FIG. 1, the vowel keys in the front row are in a different, lower, plane than the keys in the two rear rows.

The Mira has the ability to adjust key sensitivity but this adjustment is entirely mechanical, it is also inconvenient. As shown in FIG. 3, where the top of the machine is opened, there are individual key sensitivity adjustment wheels for each of the keys. Thus, in order to make any adjustment, the top of the machine must be opened. This means that stenography cannot occur while making a key sensitivity adjustment and also means that the screen of the Mira cannot be viewed while in this adjustment mode. More importantly, after an adjustment has been made, the top must be closed before the user can check to see if the adjustment was adequate. So, the adjustment process must be repeated on a trial-and-error basis for each key, which can be extremely time-consuming. FIGS. 4 and 5 illustrate the depth-of-stroke adjustment wheel and the tension adjustment wheel, respectively. It is noted that the stroke adjustment wheel is hard to reach and cannot be accessed unless the top of the machine is opened. The stroke adjustment wheel is stiff and only permits a small fraction of adjustment as compared to the entire key stroke. Practically, a user cannot type with the machine while an adjustment is being made. Similarly, the tension adjustment wheel in FIG. 5 only allows a small adjustment. Again, the top of the machine must be opened, making it impractical to write on the machine at the same time that an adjustment is being made.

In stenographic machines that are used in countries outside Europe, there are additional keys to the left of the two rear rows. These additional keys are at the same level as the keys in the rear two rows and correspond to different characters that are not needed for English transcription. These keys, in use, can be depressed individually or together. When such machines are used by United States trained stenographers, these keys are a distraction and/or get in the way of their typing. Accordingly, most machines sold in the United States do not include these keys. In other machines, such users commonly remove these keys.

FIG. 6 illustrates another prior art stenographic machine referred to as the Tréal TR, manufactured by Word Technologies. This writer is not adjustable and has plunger-activated keys. There are three holes shown on the left-hand side where the extra set of keys were positioned before they were removed. These keys existed in the same plane as the other keys of the three 10-key rear rows. Another prior art writer similar to this machine is called the Gemini, manufactured by the Neutrino Group.

SUMMARY OF THE INVENTION

It is accordingly an object of the invention to provide a stenographic keyboard device providing an extended set of keys and a method for electronically adjusting key depth sensitivity that overcome the hereinafore-mentioned disadvantages of the heretofore-known devices and methods of this general type and that provide additional keyboard functions, such as control, alt, and shift, a more convenient key height, and individual electronic adjustment of key sensitivity.

As set forth above, prior art stenographic machines sometimes include keys to the left of the 10-key rows. However, these keys are used solely for different characters and are available only for international markets; they are not used for English transcription. The present invention places a single key to the left of each of the two rear rows (these keys are in the second and third rows when start of counting begins at the front row). These two keys, in contrast to any prior art mechanism, have a top surface that is substantially lower than the top surface of the keys in the two rear rows. In particular, the top surfaces of these additional keys are at a level lower than the greatest depression level of any of the keys in the two rear rows. As such, even a full depression of the two left-most keys (corresponding to the "S" phonetic sound) will not permit the wide-pinkied user to accidentally depress either of the two additional left keys. In addition, in the normal writing position, the user will not be able to feel these extra keys, and, therefore, will not misplace his/her hands on the keyboard, which would result in inaccurate fingering.

The present invention uses these two additional keys to expand the "vocabulary" of the standard stenographic keyboard, shown, for example, in FIG. 7. With these additional keys, when any one or both are depressed, three additional keyboards and, therefore, at least 72 additional keys, can be accessed, much like the control, shift, and alt keys on a conventional computer keyboard. If a third key is added in this new column next to the fourth (top) row key, then even more key possibilities become available to the user. These additional keys can be used to represent any character or character set. They can also be used in combination with other standard keys to create additional commands, much like the control, shift, and alt commands of computer keyboards. Additional keys are also necessary for some foreign stenographic theories. Even though the new keys are disposed at a level lower than the lowest depression level of the keys, the user can be trained to use these new keys in a way to make available these foreign stenographic theories. Alternatively, the keys can be designed to rest at two different heights depending on the user's choice. In another alternative embodiment, the shorter keys can be replaced with taller keys that, when installed, have a top surface at a height equal to the top surface height of the other keys. In this way, foreign theories of stenography can be accommodated.

Four additional keys can increase the different possible combinations in one stenographic stroke from $2^{24}$ to $2^{27}$. While $2^{24}$ is already a huge number, the practical number of combinations is much lower; it is limited by the human hand to a maximum of 20 bits out of the maximum of 24 bits. The keys added by the present invention dramatically increase the useful number of keys that can be combined into a single stroke. This increase allows the reporter to write faster because they can create many more practical single-stroke entries.

An additional feature of the present invention does not place the four vowel keys of the front row in a plane lower than the keys of the two rear rows. Raising these keys produces advantages that were not provided previously. For example, stress on the wrist is reduced. Also, raising the keys makes it easier for users with small hands to reach the more distant keys when the vowel keys are simultaneously depressed.

Prior art keystroke sensing devices simply sense whether a key has been pressed or not. The device according to the invention, in contrast, senses how far a key has been pressed and displays, produces, and/or communicates intermediate values corresponding to the extent of key actuation. The output can be tertiary, in that the key is (1) not actuated, (2) partially actuated, or (3) fully actuated. Alternatively, the output can have any number of degrees, ten for example.

The keystroke device is used particularly with a stenotype machine (e.g., for court reporters) and emulates, in a modern digital stenotype machine, a sensitivity adjustment previously existing only in paper stenotype machines. In paper stenotype machines, when a court reporter lightly touched a key(s), then the paper would be printed, not with a clear print of the keystroke, but with a light or shadow keystroke. As used herein, the words "keystroke" or a "stenographic keystroke" include any possible actuation of a key device or set of key devices. In other words, the definition includes both recognized key actuations (whether for a single key or a set of more than one key) and any unrecognized, accidental, incorrect, and/or inadvertent actuation of a single key or a set of more than one key.

In the past where paper machines were only available, if a court reporter desired, the sensitivity of the paper machine could be adjusted for that court reporter's particular style of keystroke actuation using a mechanical sensitivity adjustment device. These stenotype machines had depth-of-stroke and tension adjustments that affected the whole keyboard. Individual keys could not be adjusted. It is noted that shadows were not written intentionally with these machines. They simply occurred during use and their presence could be used later to aid the reporter in determining what stroke was actually intended because a shadow indicates that a key was partially depressed during a stroke. Sometimes, the reporter means to hit the key that registered a shadow, but does not hit it hard enough. Other times, the reporter does not mean to hit the key at all, but "dragged" a key, which occurs most often with the ring finger because it is difficult to keep this finger elevated when adjacent fingers are dropped.

Even though individual adjustment of keys was not available, any adjustment of keys was considered advantageous because court reporters use their fingers for hours at a time. Adjustment of keys towards the most comfortable return bias was (and remains to be) desirable. Further, different stenographers stroke the keys in unique ways. Allowing detection of shadows permits a user to correct bad keystroke habits.

Now, digital machines are replacing paper machines. However, for prior art digital machines, if a reporter actuates a key(s) lightly, then no stroke is registered at all. Only after the stenographer depressed the key past its registration point would a stroke be registered. Because recordation of shadows helps the stenographer, it would be desirable to emulate the paper machine functionality by registering lighter keystrokes on the computer, preferably, with a visibly shadowed or visibly lighter indication on the stenotype's digital display.

The device and method according to the invention electronically senses an actuation depth of an individual key. A sensor is disposed to sense the actuation depth. In particular, an optical sensor is disposed near a cam and detects a light source emanating towards the optical sensor from another side of the cam. As the cam moves out of the light path or into the light path, such a sensor detects a strong or weak signal. The strong signal can mean that a standard character (not shadowed) is output and a weak signal can translate into a display of a shadowed character, or vice-versa depending upon the desired receiver configuration.

The device according to the invention can also include an integrated data processing system that translates, in virtual real-time, the stenographic keystrokes into understandable English and stores both data in a memory (e.g., RAM, ROM, removable media) locally or wirelessly to an external location. A significant advantage to this concept is that the remote computer has the ability to contain a superior translator to the translator present in the writer. This concept also can entirely negate the requirement of having a translator within the writer (as long as a connection to the external translator is available). The device can include a transceiver utilizing a bidirectional data channel to transmit untranslated stenographic data to a translating computer in real time. The translating computer can, then, translate the stenographic data and transmit a translated data stream back to the device, or to any combination of other devices that can be connected (directly or wirelessly) to the translating computer, for almost real time use and/or analysis by the stenographer. One example of such a system provides the stenographic device with a connection (direct or wireless) to the Internet and the translating computer with a connection (direct or wireless) to the Internet. Thus, commonly available Internet connection devices available at the location where the stenographer is taking data can be used to facilitate quick and inexpensive translation of stenographic data.

The device according to the invention can also include a multimedia recorder that can store, in a memory, digital video images and audio data. By recording the audio and/or video of the subject(s) of the stenographer on the device, it becomes possible to associate a portion of the multi-media file with a stenographic stroke. Such recording and coordination of stenographic and video and/or audio data allows the stenographer to play back images of and/or sounds from the subject to assist in the accurate translation of the stenographic keystrokes. Such multi-media data can also be transmitted to other computers and/or locations through network connections, for example, over the Internet, by wireless connections, such as Bluetooth, by direct connections, such as RS-232, universal serial bus, IRDA, Firewire, or by any other available data communications method to assist the stenographer in accurate translation of the stenographic data.

The intermediate key depth sensing ability of the present invention can be used to provide an "on-the-fly" adjustment mechanism for each key individually. The device according to the invention provides an electronic key adjustment display. In the adjustment display mode, as a key is depressed, a vertical bar (for example) drops down from the top of the screen. The farther down the key is pressed, the further the bar extends. This bar can also be color coded to indicate relative position with respect to a registration point of the key. For example, the bar can be blue in color until it reaches the currently set registration point. At the set registration point, the bar turns green. In addition to the bar extending and changing color, the particular registration point can be marked. For example, a red line can mark the registration point within the green bar or below the blue bar during the adjustment display mode. When the key is released, the red line will remain. This red line can be moved up or down using a cursor device, such as a scroll wheel. Moving the red line upwards makes the key more sensitive (i.e., the registration point is earlier in the stroke) and moving the red line downwards makes the key less sensitive (i.e., the registration point is later in the stroke).

There exists a problem with stenotype machines that have non-digital keystroke detection and registration. This problem is referred to as "stacking" and occurs when a stenographic translation system cannot distinguish between two adjacent words or keystrokes. As one could expect, if keystrokes are "blurred" from one to another, translations that need to be completely accurate will degrade appreciably if this problem is not corrected.

The present invention has the ability to sense and record the direction (down/up) of each key instantaneously. Thus, to eliminate any occurrence of stacking, the software need only be programmed to find the low-point of any key depression. When the key begins to return to the un-actuated position (i.e., moves upwards), the software recognizes that the depression of the key has finished and any further depression of that key will be considered as a new keystroke. To enhance the anti-stacking measures, the start of each up and down stroke of each key is viewed/recorded. Thus, if some keys start their down motion after other keys start their up motion, the down-motion keys are placed into the next stenographic keystroke. Applying this process virtually eliminates stacking.

The hardware-induced bounce caused by the contact-sensing mechanisms on prior art devices needed to be corrected. Accordingly, these prior art devices may have employed "de-bouncing." De-bouncing is usually performed with software or by an electronic device. The usual method is to sample the digital signal for x amount of time, called a "sample and hold" method. The time that the signal must be sampled before a determination of its state is made is directly related to the mass of the switch and the velocity of the activation. For a relatively high mass switch, this can create a minimum sample time that is greater than the physical switching time required in many applications. Another disadvantageous characteristic of prior-art de-bounce method is the increase in the possibility of separating a single intended stroke into two separate strokes.

The present invention, by using an optical system, has a sample and hold time that is only limited by the speed of the available analog to digital converters. As such, the present invention can actually treat the key events as a waveform and treat the activation event as just a point on the wave that describes the keys location and speed. The modeling of key events as waves, and not as digital events, is a breakthrough that will allow the next big step in accuracy for court reporters. The device and method of the present invention does not have the disadvantage of splitting and, therefore, entirely removes the possibility of this problem inherent in prior art stenotype machines.

With the foregoing and other objects in view, there is provided, in accordance with the invention, a stenographic device including a plurality of keys making up a standard stenographic keyboard, each key having a resting position in which the key is in an un-actuated state, a depressed position in which the key is in an actuated state where a key stroke is registered, and a range of depression positions between the resting position and the depressed position, a display, a processor communicatively coupled to the display and the plurality of keys for registering the actuation states of the keys, and a memory communicatively coupled to the processor, wherein the processor is operable to cause the display to graphically show a respective depression indicator of a current one of the depression positions for each of the keys, to store in the memory a respective key-press registration point for each of the keys, the registration point being a depression position located within the range of depression positions and indicating when the respective key is in the actuated state, and to cause the display to graphically show a respective registration indicator corresponding to the stored registration point for each of the keys.

In accordance with another feature of the invention, the depression indicator is of a first color oil the display when the key is at a depression position located between the resting position and the depression position corresponding to the registration point and the depression indicator is of a second color on the display different from the first color when the key is at a depression position located between the depression position corresponding to the registration point and the depressed position.

In accordance with a further feature of the invention, the first color is red, the second color is green, and the registration indicator is blue.

In accordance with an added feature of the invention, there is also provided a key sensitivity adjuster operable to set the registration point to a new value.

In accordance with an additional feature of the invention, there is also provided a speaker communicatively coupled to the processor, wherein the processor is operable to communicate to the speaker, and the speaker is operable to broadcast at least one audio signal for at least one of the keys to indicate a current depressed position of the at least one key.

With the objects of the invention in view, there is also provided a keyboard assembly for a stenographic machine including a plurality of character keys making up an entirety of a standard stenographic keyboard, the plurality of keys including a first set of vowel keys that, at a first rest position, together define a first upper touch surface plane, a second set of keys that, at a second rest position, together define a second upper touch surface plane that is higher than the first plane, the second set including at least one left-most key and at least one right-most key, each of the second set of keys having a fully depressed position lower than the second plane by a given distance and a key actuator to be operationally connected to a respective key sensor for registering movement of the respective key, and a third key assembly having at least one key with an upper touch surface that, at a third rest position, is further from the second upper touch surface plane than the given distance, a depressed position of the at least one key placing the upper touch surface of the at least one key lower than the third rest position, and a third key actuator to be operationally connected to a respective third-key-assembly key sensor for registering movement of the at least one key, wherein the at least one secondary key is disposed at one of to the left of the left-most keys and to the right of the right-most keys.

In accordance with yet another feature of the invention, there is also provided an association between a first one of the second set of keys and a first alphanumeric character when the at least one third assembly key is in the rest position and an association between the first one of the second set of keys and a second alphanumeric character when the at least one third assembly key is in the depressed position.

In accordance with yet a further feature of the invention, there is also provided an association between a first one of the second set of keys and a first language when the at least one third assembly key is in the rest position and an association between the first one of the second set of keys and a second language when the at least one third assembly key is in the depressed position.

In accordance with yet an added feature of the invention, there is also provided a first definition assigned to a first one of the second set of keys when the at least one third assembly key is in the rest position and a second definition assigned to the first one of the second set of keys when the at least one third assembly key is in the depressed position.

In accordance with yet an additional feature of the invention, the third key assembly comprises a first third-key-assembly key with an upper touch surface at the third rest position and a depressed position placing the upper touch surface of the first third key assembly key lower than the third rest position and a second third key assembly key with an upper touch surface at the third rest position and a depressed position placing the upper touch surface of the second third key assembly key lower than the third rest position, and at least one of the second set of keys has a first definition associated with it when the first third key assembly key and second third key assembly key are in the third rest position, a second definition associated with it when the first third key assembly key is in the third rest position and the second third key assembly key is in the depressed position, a third definition associated with it when the first and second third assembly keys are in the depressed position, and a fourth definition associated with it when the first third key assembly key is in the depressed position and the second third key assembly key is in the third rest position.

In accordance with again another feature of the invention, there is also provided a first definition assigned to the at least one third-key-assembly key and a second definition assigned to the at least one third-key-assembly key when the third-key-assembly key sensor registers a movement of the at least one third-key-assembly key from the rest state to the depressed state and back to the rest state.

With the objects of the invention in view, there is also provided a keyboard for a stenographic machine including a group of character keys making up at least a portion of a stenographic keyboard, each character key having a first resting position at a first height and a first depressed position at a second height and at least one secondary key located immediately adjacent the group of character keys, the secondary key having a second resting position at a third height and a second depressed position at a fourth height, the third height being lower than the second height.

In accordance with again a further feature of the invention, the first height is defined by a touch surface of a character key at the first resting position, the second height is defined by the touch surface of the character key at the first depressed position, the third height is defined by a touch surface of the secondary key at the second resting position, and the fourth height is defined by a touch surface of the secondary key at the second depressed position.

In accordance with again an added feature of the invention, the at least one secondary key is two secondary keys.

In accordance with again an additional feature of the invention, each of the secondary keys enters a state once placed in the second depressed position and each of the secondary keys exits the state after repeating placement of the secondary key in the second depressed position.

In accordance with still another feature of the invention, each of the secondary keys remains in the second depressed position when depressed for a first time and exits the second depressed position after being depressed for a second time.

In accordance with still a further feature of the invention, at least one key in the group of character keys has an association with a first character when the first and second secondary keys are in the second resting position, an association with a second character when the first secondary key is in the second resting position and the second secondary key is in the second depressed position, an association with a third character when the first and second secondary keys are in the second depressed position, and an association with a fourth character when the first secondary key is in the second depressed position and the second secondary key is in the second resting position.

In accordance with still an added feature of the invention, there is also provided an association between a given key in the group of character keys and a first character when the secondary key is in the second resting position and an association between the given key in the group of character keys and a second character when the secondary key is in the second depressed position.

In accordance with still an additional feature of the invention, there is also provided an association between a given key in the group of character keys and a first language when the secondary key is in the second resting position and all association between the given key in the group of character keys and a second language when the secondary key is in the second depressed position.

With the objects of the invention in view, there is also provided a method for entering information through a keyboard of a stenographic machine, including the steps of entering at least a portion of a first stenographic character into a stenographic machine by transitioning at least one key in a first set of keys from a first rest position defined by a first upper surface of the first set of keys to a fully depressed position at a given distance away from the first upper surface in a key-depressing direction, the first set of keys including stenographic consonant and vowel keys, transitioning at least one key in a second set of keys different from the first set of keys from a second rest position to a second depressed position, the second rest position being further from the first rest position in the key-depressing direction than the given distance, and, while the at least one key in the second set of keys is in the second depressed position, entering at least a portion of a second stenographic character different from the first stenographic character by transitioning the at least one key in the first set of keys from the first rest position to a depressed position.

In accordance with another mode of the invention, there is provided the steps of actuating a first stenographic keystroke of the first set of keys to create a first stenographic character with the stenographic machine and, while the at least one key in the second set of keys is in the depressed position, actuating the first stenographic keystroke of the first set of keys to create a second stenographic character with the stenographic machine different from the first stenographic character.

In accordance with a further mode of the invention, there is provided the steps of assigning a first definition to the first stenographic keystroke and assigning a second definition to a second stenographic keystroke.

In accordance with an added mode of the invention, there is provided the steps of the first stenographic character is associated with a first language and the second stenographic character is associate with a second language.

In accordance with an additional mode of the invention, there is provided the steps of assigning a first definition to the first stenographic character and assigning a second definition to the second stenographic character.

In accordance with yet another mode of the invention, there is provided the steps of returning the at least one key in the second set of keys from the depressed position to the second rest position and, thereafter, transitioning the at least one key in the first set of keys from the first rest position to the depressed position to enter at least the portion of the first stenographic character.

With the objects of the invention in view, there is also provided a method for entering information through a keyboard of a stenographic machine, including the steps of entering at least a portion of a first stenographic character into a stenographic machine by transitioning at least one key in a first set of keys from a first rest position defined by an upper surface of the first set of keys to a first fully depressed position that is a given distance away from the upper surface in a key-depressing direction, the first set of keys including stenographic consonant and vowel keys and each having an actuated depressed position, transitioning a touch-on/touch-off control key different from the first set of keys to a touch-on state, the touch-on/touch-off control key having a second rest position and a second depressed position, the second rest position being further from the first rest position than the given distance, and after the touch-on/touch-off control key has been transitioned into the touch-on state, entering at least a portion of a second stenographic character different from the first stenographic character into the stenographic machine by transitioning the at least one key in the first set of keys from the first rest position to an actuated depressed position.

In accordance with yet a further mode of the invention, the first character entering step comprises actuating a first stenographic keystroke of the first set of keys to create a first stenographic character with the stenographic machine, and the second character entering step comprises actuating the first stenographic keystroke of the first set of keys to create a second stenographic character with the stenographic machine different from the first stenographic character.

In accordance with yet an added mode of the invention, there is provided the steps of assigning a first definition to the first stenographic keystroke and assigning a second definition to a second stenographic keystroke.

In accordance with yet an additional mode of the invention, the first stenographic character is associated with a first language and the second stenographic character is associate with a second language.

In accordance with again another mode of the invention, there is provided the steps of assigning a first definition to the first stenographic character and assigning a second definition to the second stenographic character.

In accordance with again a further mode of the invention, there is provided the steps of, after the second entering step, transitioning the touch-on/touch-off control key from the second rest position, to the second depressed position, and back to the second rest position, and entering, after the touch-on/ touch-off control key has been transitioned for the second time from the second rest position, to the second depressed position, and back to the second rest position, at least a portion of the first stenographic character into the stenographic machine by transitioning the at least one key in the first set of keys from the first rest position to the first fully depressed position.

In accordance with again an added mode of the invention, there is provided the steps of, after the second entering step transitioning the touch-on/touch-off control key from a touch-on state to the touch-off state and after the touch-on/touch-off control key has been transitioned back to the touch-off state entering at least a portion of the first stenographic character into the stenographic machine by transitioning the at least one key in the first set of keys from the first rest position to the first fully depressed position.

With the objects of the invention in view, there is also provided a method for entering information through a keyboard of a stenographic machine, including the steps of entering at least a portion of a first stenographic character into a stenographic machine by transitioning at least one key in a first set of keys from a rest position defined by an upper surface of the first set of keys to a fully depressed position that is a given distance away from the upper surface in a key-depressing direction, the first set of keys including stenographic consonant and vowel keys and each having an actuated depressed position, transitioning a touch-on/touch-off key different from the first set of keys from a touch-off rest position to a touch-on depressed position, the touch-off rest position being further from the rest position in the key-depressing direction than the given distance, and while the touch-on/touch-off key is in the touch-on depressed position, entering at least a portion of a second stenographic character different from the first stenographic character into the stenographic machine by transitioning the at least one key in the first set of keys from the rest position to an actuated depressed position.

In accordance with again an additional mode of the invention, there is provided the steps of actuating a first stenographic keystroke of the first set of keys to create a first stenographic character with the stenographic machine, and, while the touch-on/touch-off key is in the touch-on depressed position, actuating the first stenographic keystroke of the first set of keys to create a second stenographic character with the stenographic machine different from the first stenographic character.

In accordance with still another mode of the invention, there is provided the steps of assigning a first definition to the first stenographic keystroke and assigning a second definition to the second stenographic keystroke.

In accordance with still a further mode of the invention, there is provided the steps of the first stenographic character is associated with a first language and the second stenographic character is associate with a second language.

In accordance with still an added mode of the invention, there is provided the steps of assigning a first definition to the first stenographic character and assigning a second definition to the second stenographic character.

In accordance with a concomitant mode of the invention, there are provided the steps of, after the second entering step transitioning the touch-on/touch-off key from the touch-on depressed position to the touch-off rest position and after the touch-on/touch-off control key has been transitioned to the touch-off rest position, entering at least a portion of the first stenographic character into the stenographic machine by transitioning the at least one key in the first set of keys from the first rest position to the first fully depressed position.

Other features that are considered as characteristic for the invention are set forth in the appended claims.

Although the invention is illustrated and described herein as embodied in a stenographic keyboard device providing an extended set of keys and a method for electronically adjusting key depth sensitivity, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Emulation of the appearance of a printed stenotype output with a paperless electronic stenotype machine having an electronic display (e.g., LED, LCD, Flat Panel) can occur by electrically supplying depth information for each key pressed by the user in addition to the electronic data corresponding to the particular stenographic stroke, also sometimes referred to herein as a "word". When a stroke is registered but is within a specified range less than a full depth of the stroke, the stroke can be stored electronically as a shadow. If, for example, ten values of shadow can be detected (or are programmed to be detectable), those values can be assigned to a specific level of brightness (e.g., in a look-up table or programmed in an EEPROM or stored in a flash RAM, hard drive, or static RAM) or, instead of a look-up table, an equation can be used to shift the depth value byte four bits to get an intensity scale. Thus, the shadow will display on the output screen as characters lighter than a non-shadowed character. Instead of using merely brightness of the character(s) as the visible indicator, the shadow can also be varied using a difference in color, font, or other display attribute, or even by a combination of different display attributes.

Figure 1:
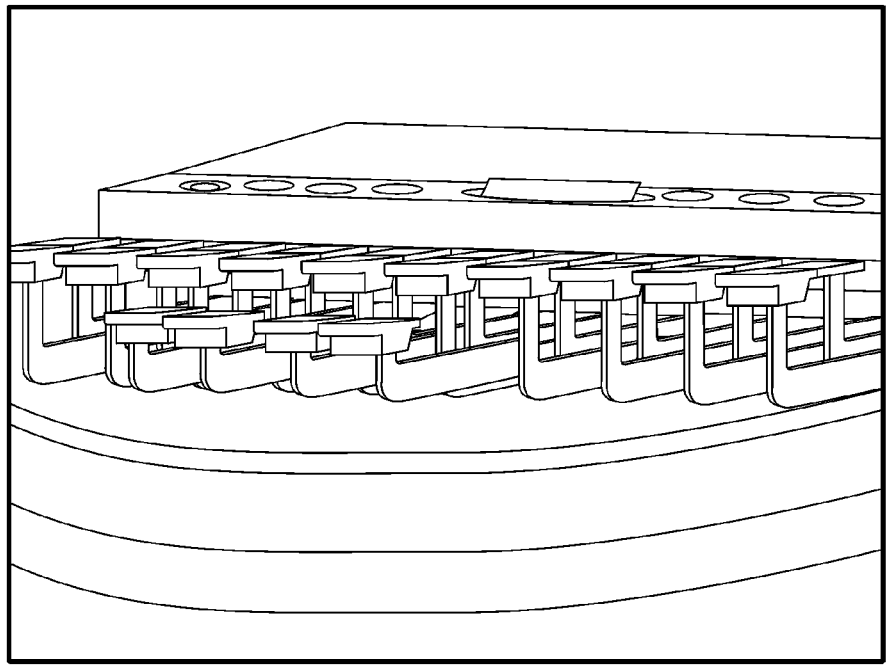
FIG. 1 is a fragmentary, perspective view of a prior art stenographic machine from the front.
Figure 2:
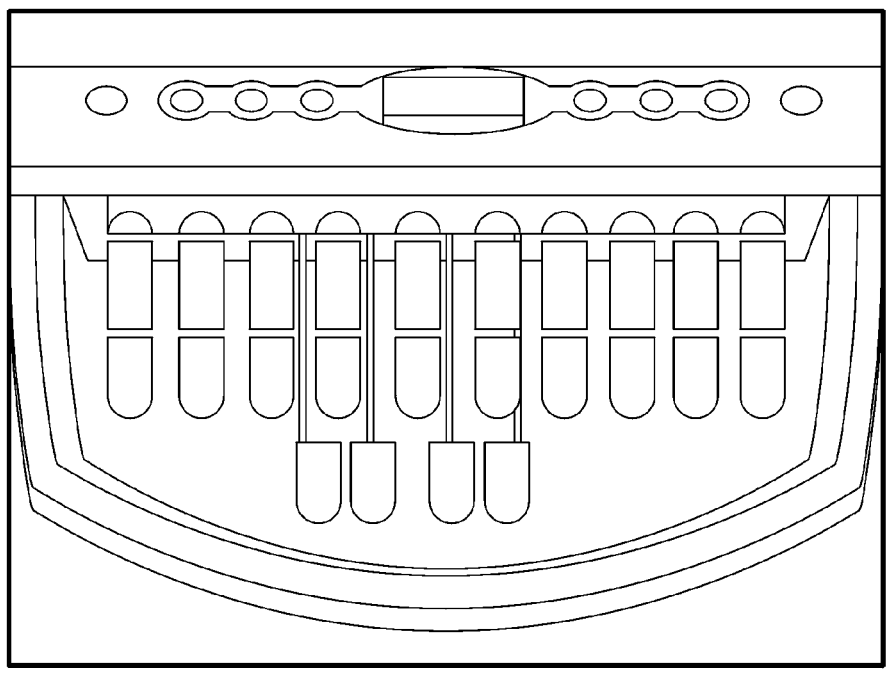
FIG. 2 is a fragmentary, perspective view of the prior art stenographic machine of FIG. 1 from above the front.
Figure 3:
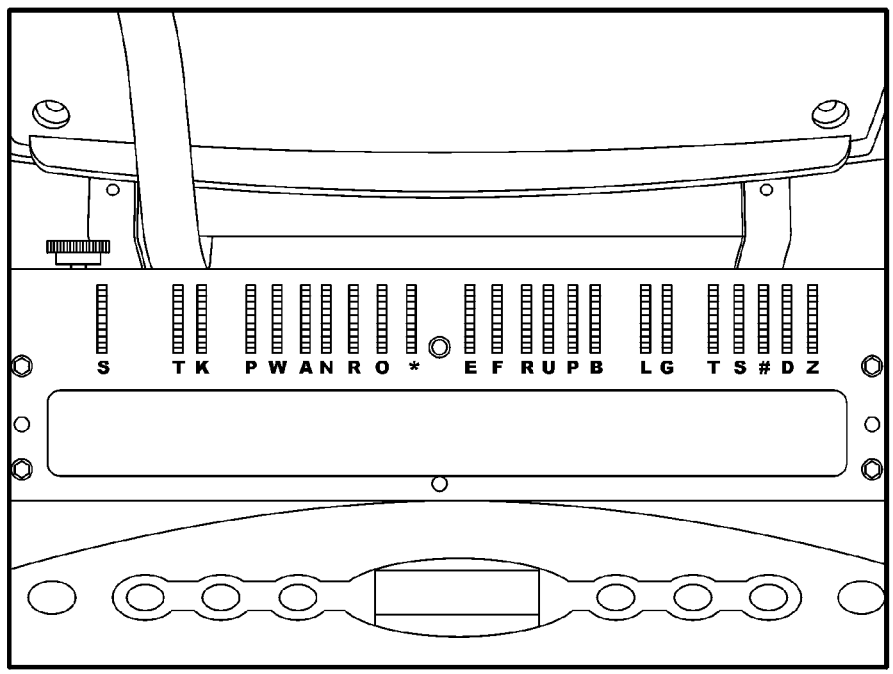
FIG. 3 is a fragmentary, perspective view of an interior portion of the prior art stenographic machine of FIG. 1 from above the front.
Figure 4:
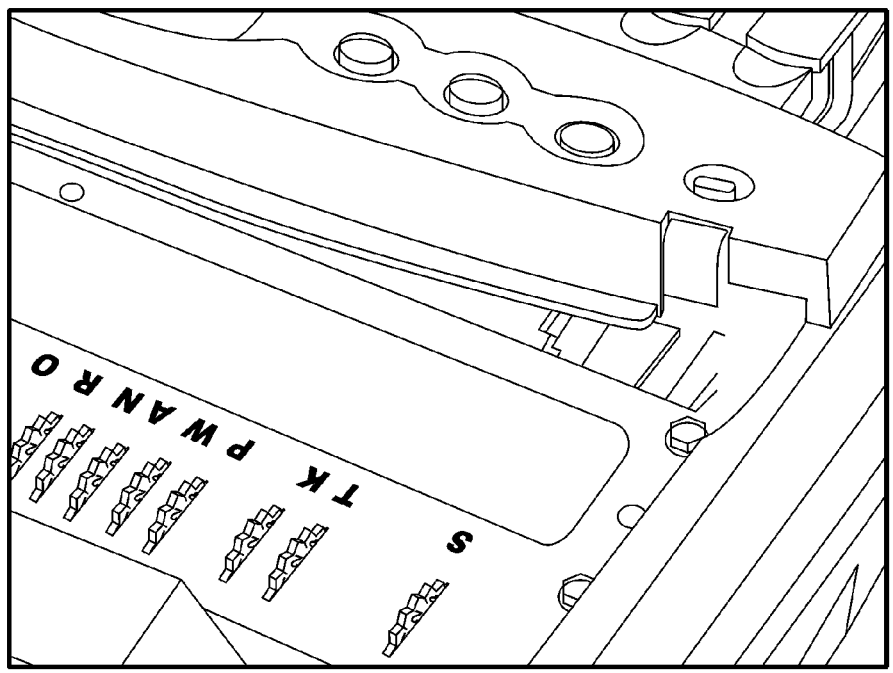
FIG. 4 is a fragmentary, perspective view of another interior portion of the prior art stenographic machine of FIG. 1 from above the rear.
Figure 5:
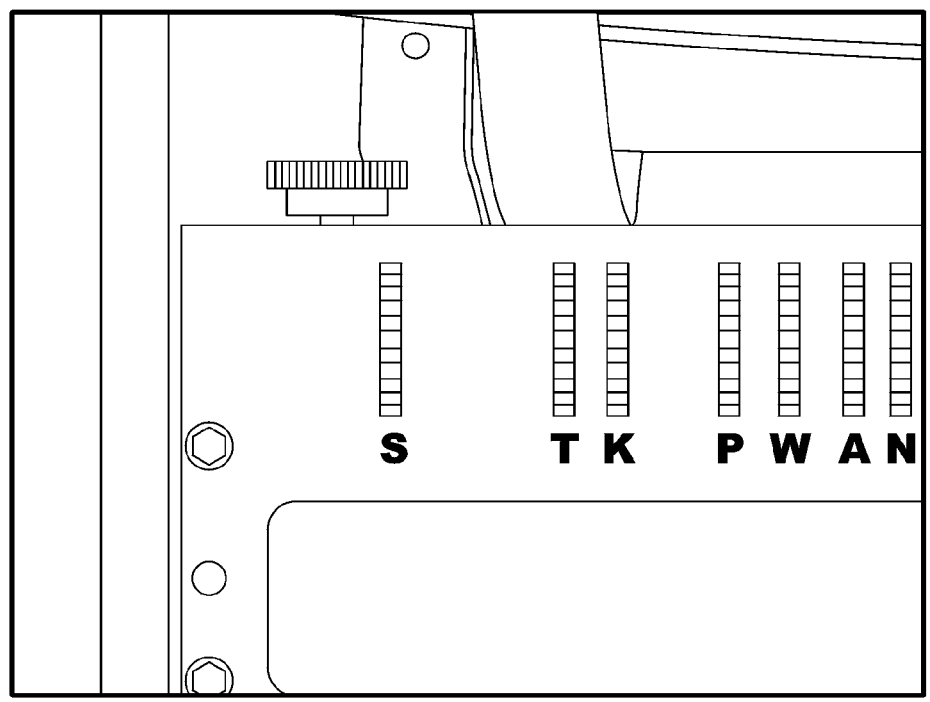
FIG. 5 is a fragmentary, enlarged, perspective view of a portion of the prior art stenographic machine of FIG. 3 from above the front.
Figure 6:
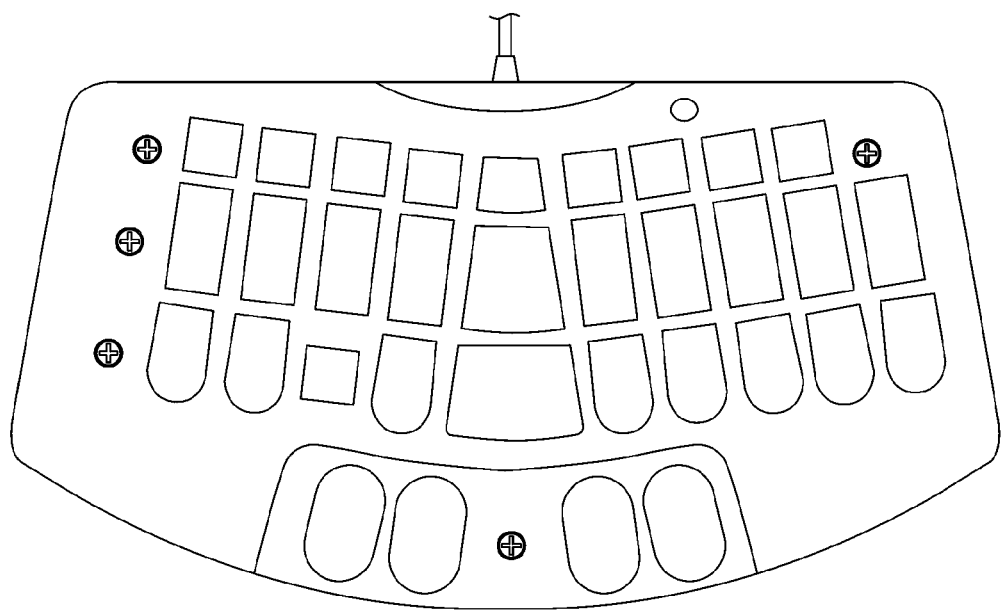
FIG. 6 is a fragmentary perspective view of another prior art stenographic machine from above the front.
Figure 7:
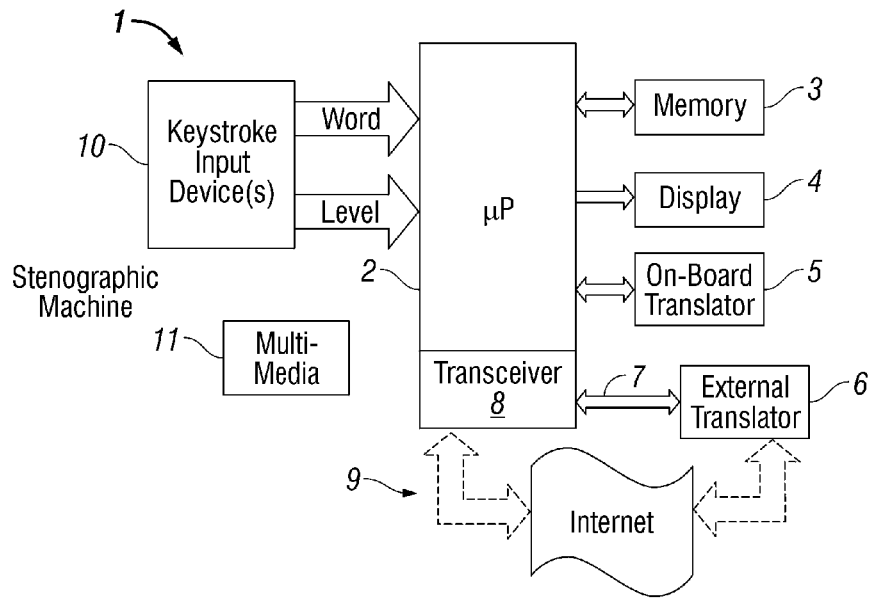
FIG. 7 is a block circuit diagram of a stenographic system according to the invention.

Referring now to the figures of the drawings in detail and first, particularly to FIG. 7 thereof, there is shown a block circuit diagram of a stenographic device according to the invention. The stenographic machine 1 has a keyboard 10 having plurality of keystroke devices, which are connected to an on-board microprocessor 2. A memory 3 (e.g., RAM, ROM, hard drive, removable memory) is connected to the microprocessor 2 for storing data and supplying stored data to the microprocessor 2. A display 4 is connected to the microprocessor 2 for displaying stenographic and/or translated data and for displaying the shadows determined/detected by the microprocessor 2. The microprocessor 2 controls all electronic operations including receiving stenographic data and shadow data, storing all data, and displaying all desired processes, which processes can include the stenographic and/or level data itself, indications that data is being stored, indications that data is being translated, translated stenographic output, and in many others.

Depending upon the configuration of the stenographic device, a translator 5 can be on-board the device and, therefore, it is directly connected to the microprocessor 2 for translating stored or incoming (real-time) stenographic data. Thus, input electronics for the keystroke device can be directly connected to the same processor 2 that controls the translation program, and the functions of input, shadow determination, translation, and correction/editing can be performed on a single unit 1.

If the translator is not on board the stenographer's device 1, then the device 1 can be connected to an external stenographic translator 6, in which case the translator 6 is separate from the stenographic device 1 and information stored in the memory 3 is relayed 7 either by transfer through an intermediate media (e.g., floppy disk, micro-drive), in which case the device will have a floppy drive, USB port, Firewire port, etc., or wirelessly through some kind of communication data link (e.g., a Bluetooth, ISDN, Internet, or other wireless data link), in which case the device will have an on-board transceiver 8.

In either case, the translator 5, 6 translates the stenographic data to the respective language (e.g., English). When the device 1 is associated directly with a translation system, translation occurs quickly so that the stenographer can view his/her stenographic keystrokes in almost real-time and in relatively understandable English (dependent upon the quality of the word/translation processor). The memory 3 will store the translation locally 3, II and/or externally 7, 9.

FIG. 7 further illustrates the stenographic device 1 and an embodiment 9 for connecting the device to an external stenographic translator 6. In the example of FIG. 7, the translator 6 is connected to the Internet and is housed at a location different from the stenographer's location. In such a networked configuration, the transceiver 8 can utilize a bi-directional data channel to transmit the un-translated stenographic data to the external translating computer 6 (represented by the dashed arrows), whether in real time or delayed. The translating computer 6 can, then, translate the stenographic data and transmit a translated data stream back to the device immediately or at a later time and to any other device that can be connected (directly or wirelessly) to the translating computer (also represented by the dashed arrows). Thus, the stenographer can have almost real-time analysis even without having an on-board translator.

One example of such a system 9 provides the stenographic device 1 with a connection (e.g., a direct or wireless transceiver 8) to the Internet and the external translating computer 6 with a connection (direct or wireless) also to the Internet. Thus, commonly available Internet connection devices available at the location where the stenographer is taking data can be used to facilitate quick and inexpensive translation of stenographic data without having to store the translation software on the stenographer's machine 1.

When the device 1 has an integrated word processing system, then the functions of dictation, translation, and editing of the translation can be performed by the stenographer on a single machine.

The device 1 can also include a multi-media recorder 111 that can store, in an on-board memory or the memory 3, digital video images and/or audio data. By recording the audio and/or video of the subject(s) of the stenographer on the device, it becomes possible to associate a portion of the multi-media file with a stenographic stroke. Such recording and coordination of stenographic and video and/or audio data allows the stenographer to playback images of and/or sounds from the subject to assist in the accurate translation of the stenographic keystrokes. Such multi-media data can also be transmitted to other computers and/or locations through network connections, for example, over the Internet, by wireless connections, such as Bluetooth, by direct connections, such as RS-232, universal serial bus, IRDA, Firewire, or by any other available data communications measures to assist the stenographer in accurate translation of the stenographic data.

If a stroke registered by the device is not in the user's stenographic dictionary, an internal algorithm of the translator 5, 6 can be activated to add and/or remove shadowed keys from the stroke until a stenographic match is found for the particular key(s) activation, somewhat like a closest-match routine known in the art of spell-checking devices. Thus, where a partial key actuation (shadow) occurs and the keystroke is not translatable, the shadowed keystroke can be combined with other similar stenographic keystrokes and, along with a spelling and grammar checking device, and can be corrected to fix a mis-stroke or can provide the stenographer with a list of various possible translations for that mis-stroke, which list would be examined by the stenographer at a later time, i.e., when the stenographic dictation breaks or at another location entirely.

Figure 8:
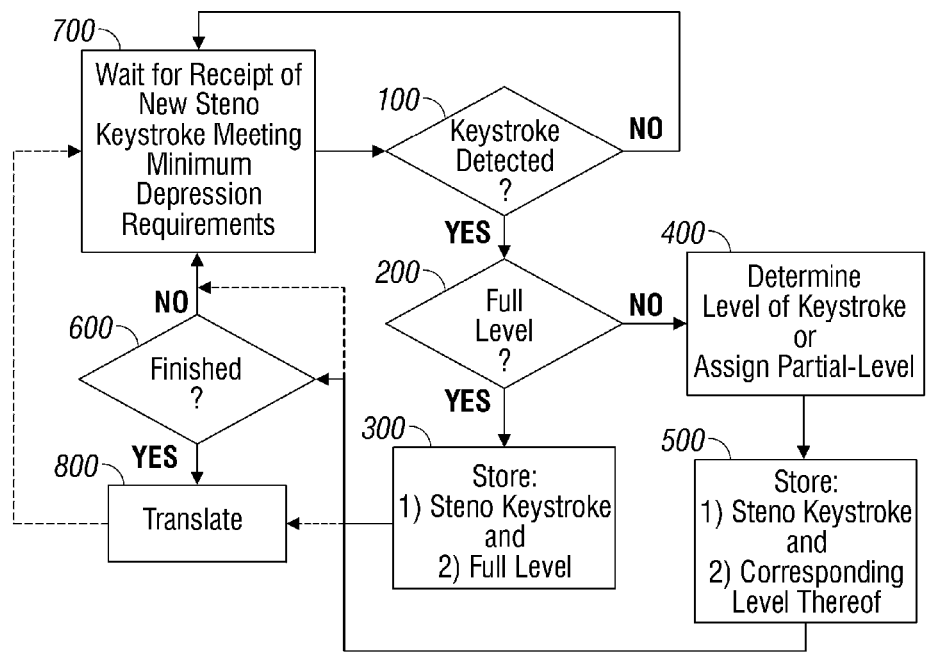
FIG. 8 is a flow chart illustrating a first embodiment of the method for assigning shadows according to the invention.

A first exemplary method for interpreting a depth of the keystroke is illustrated with respect to the flowchart of FIG. 8.

In Step 100, a query is performed to determine if a stroke has been detected. If a stroke has been detected, then, in Step 200, the level of the stroke is determined, in other words, whether or not the stroke is a shadow stroke. If the level is determined to be full (complete actuation of the keystroke), then, the corresponding stenographic stroke with or without a full-level indicator is/are stored/transcribed in Step 300. If the level of the stroke is determined to be partial, then two possibilities occur. If the system is only configured to register a full stroke or a partial-stroke, then, in Step 400, the just-received stenographic stroke is indicated as being a partial-level (shadow), and the corresponding stenographic keystroke and a shadow indicator are stored/transcribed in Step 500. If, however, the system is configured to detect more than just one partial-level, the corresponding actuation level is detected and the appropriate shadow is determined along with the detection of the just-received stenographic stroke in Step 400. In such a case, the corresponding stenographic stroke and shadow level are stored/transcribed in Step 500.

A query is made in step 600 to determine if stroke entry is finished (which, for example, may be indicated by a separate input from the stenographer). If the answer is no (e.g., the default situation), then, the device 1 waits in Step 700 for the receipt of a new stroke (meeting a predefined minimum keystroke depth requirement).

Registering of a keystroke is detected in Step 100 by a change transmitted by a keystroke device sensor, e.g., in an analog voltage or by a digital position indicator. In a digital system, the depth of the keystroke is translated into a digital numeric value. The value can have more than three variations or can be a tertiary value, including on, off, and shadow. Subsequently, the value is translated into a visual indicator for the corresponding shadow or full value, the indicator including color, shade, font style, position, and/or size of the symbol that represents the actuated key or set of keys (these examples being only representative of possible visual display characteristics). If the stenographer is finished entering keystrokes (i.e., end of the job), then the keystrokes are translated in Step 800. It is noted that translation can be in real-time and, therefore, the circuit of Steps 100 to 700 can be repeated continuously and occur in parallel with translation. In such a configuration, Step 600 would be omitted and the dashed arrows in FIG. 8 would be performed instead.

Figure 9:
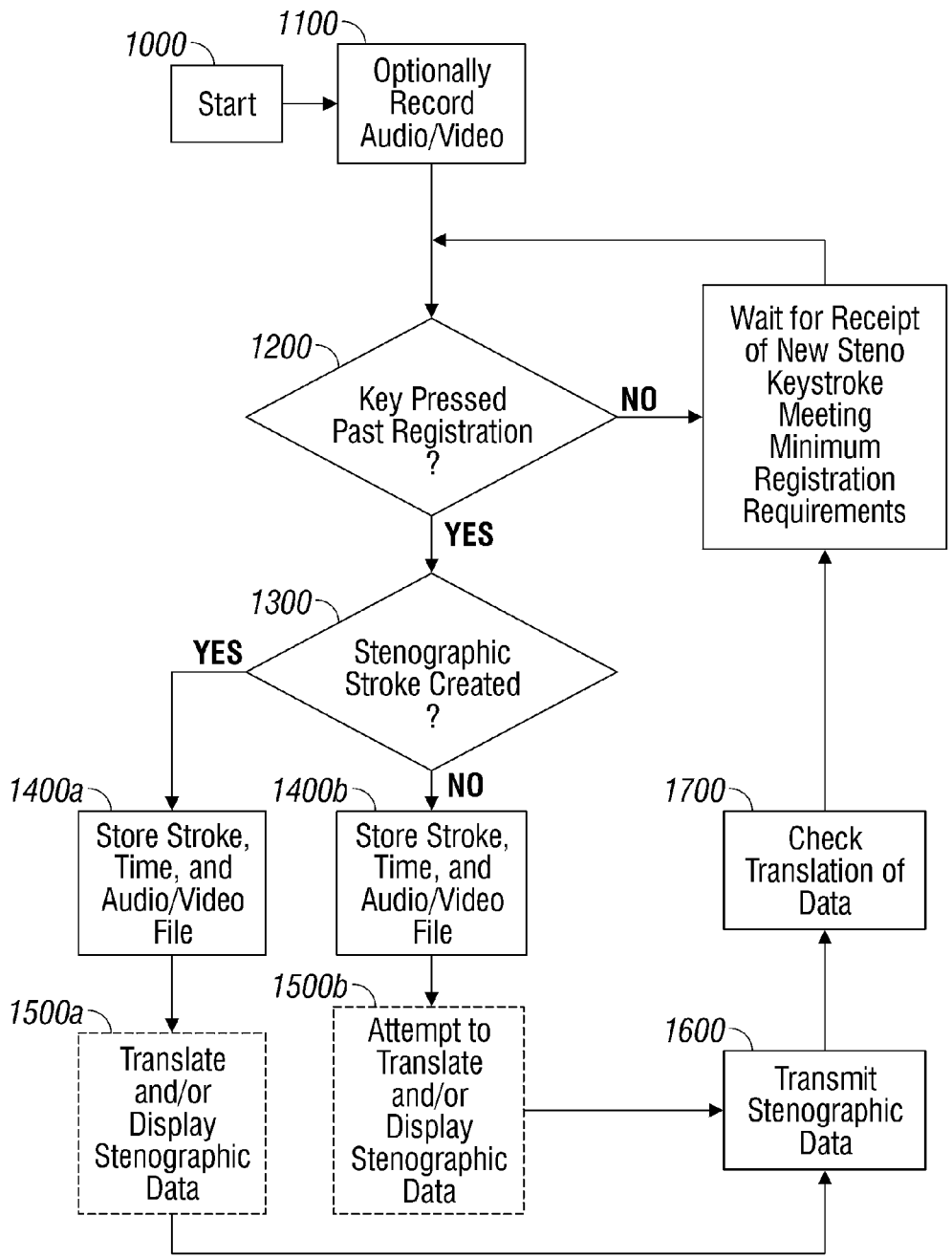
FIG. 9 is a flow chart illustrating a second embodiment of the method for assigning shadows according to the invention.

A second exemplary method for interpreting depth of the keystroke is illustrated with respect to the flowchart of FIG. 9. In Step 1000, the stenographic dictation begins. In Step 1100, audio and/or video of the proceedings to be stenographed are recorded electronically, which recording is an option to be selected by the stenographer. In Step 1200, a query is performed to determine if any key has been pressed past its registration point. If not, the system waits until this event occurs. In Step 1300, a query is performed to determine if all keys that are past the registration point create a recognizable stenographic stroke.

If the answer is yes, then, in Step 1400a, the time of the recognizable stroke is recorded and stored with the stenographic data in a mass storage device and/or internal memory and the audio and/or video data file is also stored along with information regarding the location in the data file of the stored stenographic data. Accordingly, the user can go back to the stenographic stroke and correct any errors in transcription by examining the relevant video and/or audio. It is optional, in Step 1500a, to pass the stored stenographic stroke to an internal translator and/or to produce a text display.

If the answer is no and a recognizable stenographic stroke is not created, then an attempt to produce a recognizable stroke is performed based upon all of the keys that passed the registration point in combination with any partial key presses that did not reach registration point but were pressed in some way. Specifically, in Step 1400b, the time of the unrecognizable stroke is recorded and stored with the stenographic data in a mass storage device and/or internal memory and the audio and/or video data file is also stored along with information regarding the location in the data file of the stored stenographic data. Accordingly, the user can go back to the stenographic stroke and correct any errors in transcription by examining the relevant video and/or audio. In Step 1500b, the unrecognizable stroke is passed to an internal translator to find a likely match or a set of possible matches. A text display can be made and/or a suitable signal (beep) can occur to notify the user that a potential error in transcription has occurred. The user can view the stroke, which will include any partial key presses identified by a different color, intensity of color, font, and/or size. If possible (because transcription is still occurring), the user can select the appropriate translation from the suggestions in real time.

In Step 1600, the stenographic data is transmitted to an external translator through some communications link, e.g., RS-232, USB, Network, Bluetooth, Firewire, WIFI, or any other data transmission measures. Optionally, in Step 1700, an external translator can check the translation data and relay that data through an available output device, such as an RS-232 port or network connection to an external display device such as a computer. This process is repeated until dictation is complete.

It is noted that the optional recording of audio and/or video data allows CIC and permits the user to track the stenographic data with the corresponding audio/video data and, thereby, correct any incorrect stenographic translation.

Figure 10:
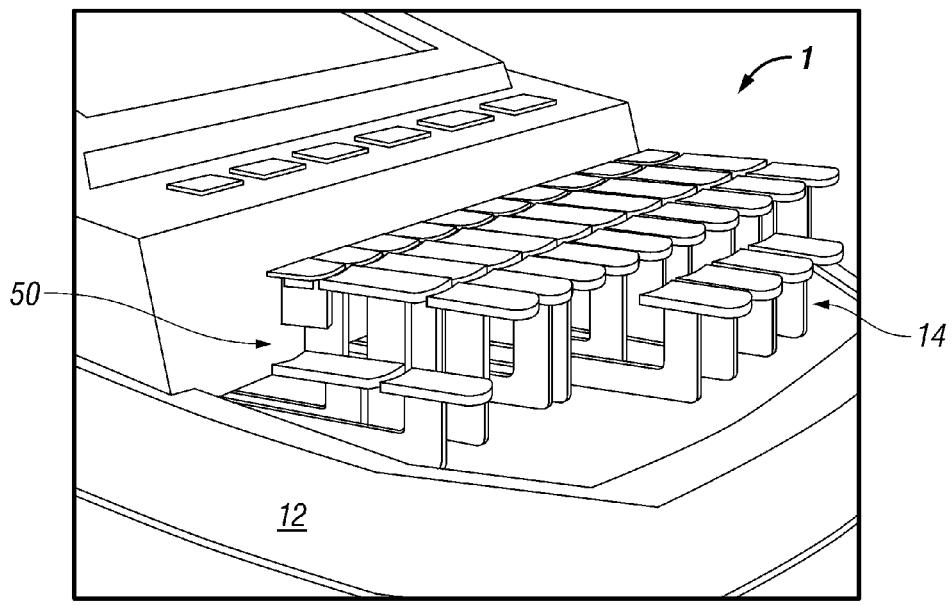
FIG. 10 is a fragmentary, perspective view of the stenographic machine according to the invention from a front left side.
Figure 11:
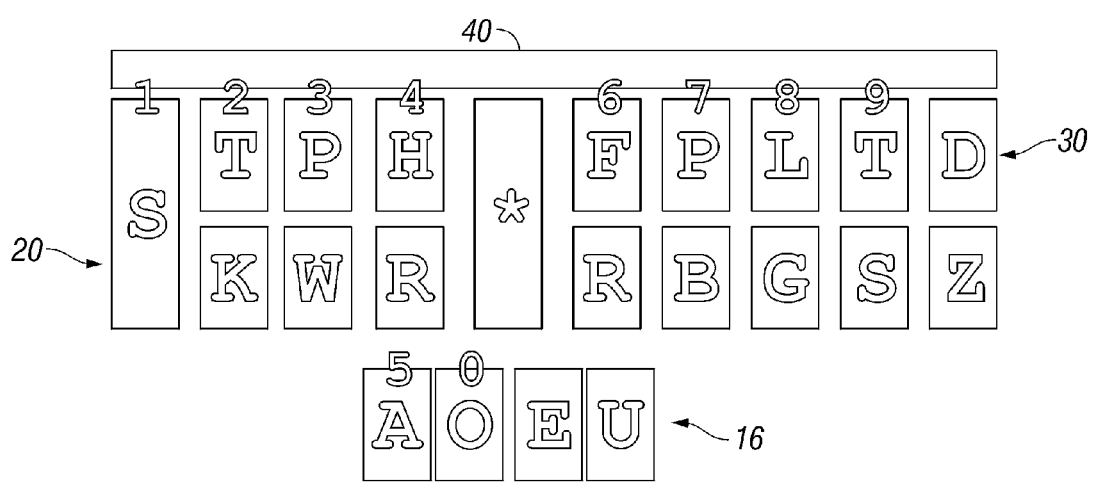
FIG. 11 is a diagrammatic illustration of a standard stenographic keyboard.

FIG. 10 illustrates a side view of a first embodiment of a stenographic writer 1 of the present invention. The writer 1 has a body 12 and a keyboard 14, making up an entirety of a standard stenographic keyboard. The keys shown in FIG. 10 are illustrated in their normal rest, or undepressed, state. A conventional stenographic keyboard has four rows, the front row 16 having four keys corresponding to vowels and two rear rows 20, 30 of ten keys each as shown in FIG. 11. The two left-most keys correspond to the same letter and, therefore, are shown in FIG. 11 as a single key. On traditional machines, an "S" is produced whether the reporter presses the key in the second row or the third row because these keys are tied together—they are essentially one key. By adding an additional key in the present invention, the reporter has the option of defining each key differently. The benefits are the same as for the extra keys on the far left-hand side of the keyboard. The present invention also employs the same separation with the asterisk key, located at the middle of the keyboard. On traditional machines, although it might appear that there are two keys in the middle, they are, in fact, tied together and generate the same code.

The fourth row 40 of keys can take any form but is, commonly, a single key having a width equal to the ten adjacent keys of the rear rows 20, 30. This single key 40 can, in another embodiment, be a set of keys, each having a separate corresponding definition. As used herein with respect to keys, "rear" is a position that is further away from the user than "front."

With respect to FIGS. 10 to 13, the four vowel keys are shown in a front or first row 16 and, in the embodiment of FIG. 10, they are positioned in a conventional lower position. Here, "lower" is used as a relative word to compare the top surface of the keys in the first row 16 to the top surface of the keys in the second, third, and fourth rows 20, 30, 40, the top surfaces of which are all at the same height.

The keyboard 3 of the present invention includes a side Column 50 of two additional keys 52 and 54, which are referred to herein as control keys. The keys in the second, third, and fourth rows 20, 30, 40 can each be depressed to a lower-most position. The top surface of these keys when in this lower-most position is relatively higher than the top surface of the control keys 52, 54 when these keys are not depressed. As such, when the left-most keys in either of the second, third, and fourth rows 20, 30, 40 are depressed, a finger that is on the left edge will not depress either of the two control keys 52, 54. In other words, the user must make a conscious decision to depress either or both of these keys.

These control keys 52, 54 have various uses. One exemplary use that is applied in the writer 1 of the present invention expands the "vocabulary" of the stenographic keyboard defined by the first to fourth rows 16, 20, 30, 40. With these control keys 52, 54, when any one or both are depressed, three additional keyboards can be accessed. Therefore, using the programming of the control system of the writer 1 to assign a different definition to each key when either the first control key 52, the second control key 54, or both control keys 52, 54 are depressed adds 72 additional keys to the twenty-four key original keyboard.

The control keys 52, 54 can be press-on/press-off keys so that when pressed once, they stay depressed and, upon a second depression, they turn off. This feature would be beneficial, for example, if non-activation of the keys 52, 54 is an English keyboard where activation of one of the two control keys 52, 54 would turn the keyboard into a Spanish keyboard. The press-on/press-off function can be either mechanical or electronic. More specifically, once pressed, the key can stay depressed until it is pressed a second time, where it will physically return to its original starting height. Alternatively, once the key is depressed, a "flag," or bit will be set indicating the transition from a rest state to the depressed state. In this electronic embodiment, although the key physically returns to the starting rest state, the status of the key is "depressed." To return the key to its original state, the key is transitioned again from the rest to the depressed, and back to the rest state.

Figure 12:
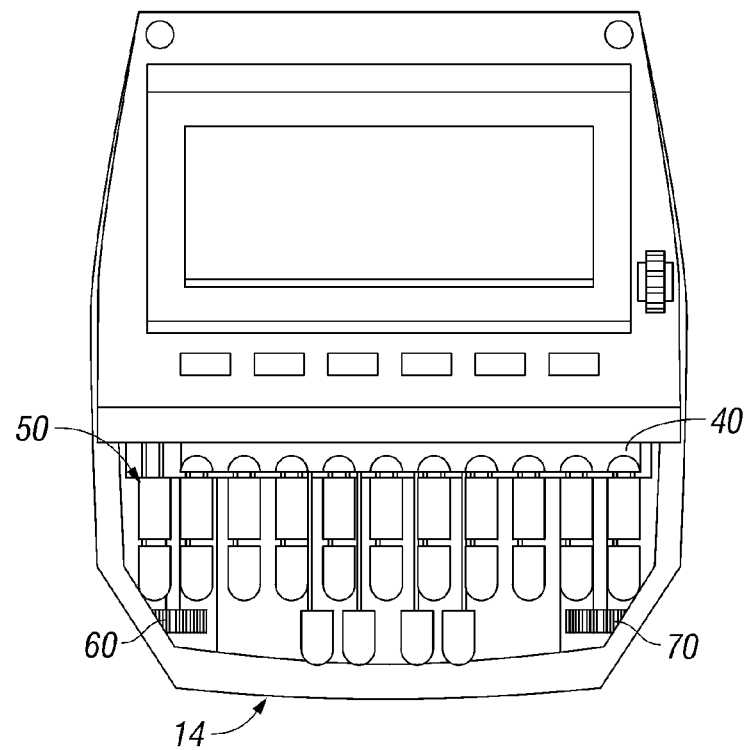
FIG. 12 is a plan view of the stenographic machine of FIG. 10.
Figure 13:
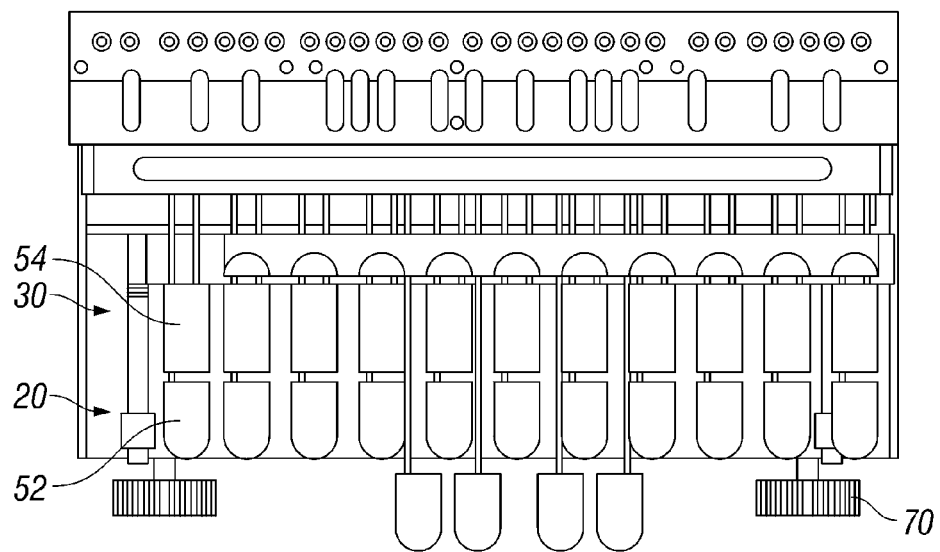
FIG. 13 is a plan view of the keyboard assembly of the stenographic machine of FIG. 10.
Figure 14:
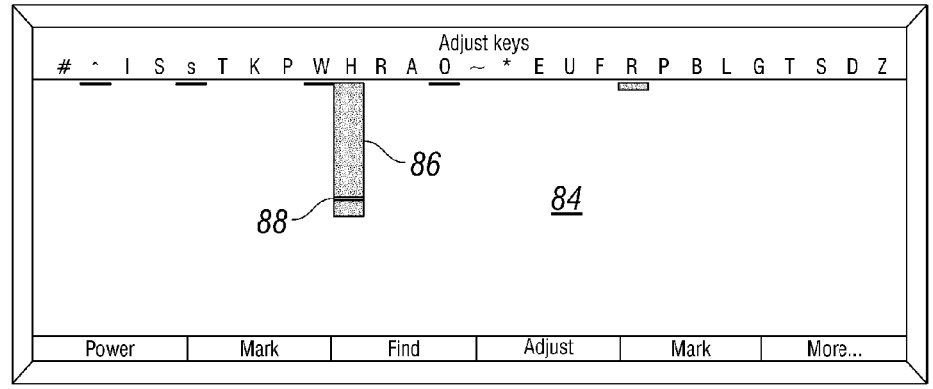
FIG. 14 is a plan view of an exemplary display of the stenographic machine of FIG. 10 indicating a single key pressed past a registration point.

FIGS. 12 and 13 are plan views of the writer 1 according to the present invention in a second embodiment where the first row 16 of keys are in the same plane as the second to fourth rows 20, 30, 40 of keys. Such a configuration of first row 16 keys has been found to reduce the tension and stress on the stenographer's hands and wrists and makes it easier for users with small hands to reach more distant keys when the vowel keys are simultaneously depressed, for example. FIG. 12 is the keyboard 3 installed in the writer 1 and FIG. 13 is a view of only the keyboard 10 and its associated key actuation hardware. In this latter view, adjustment knobs 60, 70 for both tension and depth of stroke are visible on either side of the keyboard 3. As shown in FIGS. 13 and 14, these knobs 60, 70 can be easily reached by the user to permit key adjustments with one hand while the stenographer remains able to stroke the keyboard with the other hand. This feature is found nowhere in the prior art to permit immediate tactile feedback.

In this embodiment, the knob 60 on the left-hand side adjusts the depth of stroke, for example. When it is turned, all the keys 16, 20, 30, 40, 50 move up or down as a single unit. Correspondingly, the knob 70 on the right-hand side controls how much pressure is required to depress the keys. This knob 70 sets pressure the same for all of the keys at the same time.

As set forth above, each of the keys 16 has a sensor(s) for sensing the depressed and fully depressed position and at least one intermediate depressed position. This sensing of intermediate positions provides additional benefits that were previously not able to be achieved. Specifically, registration and custom sensitivity settings for each key are now possible.

Figure 16:
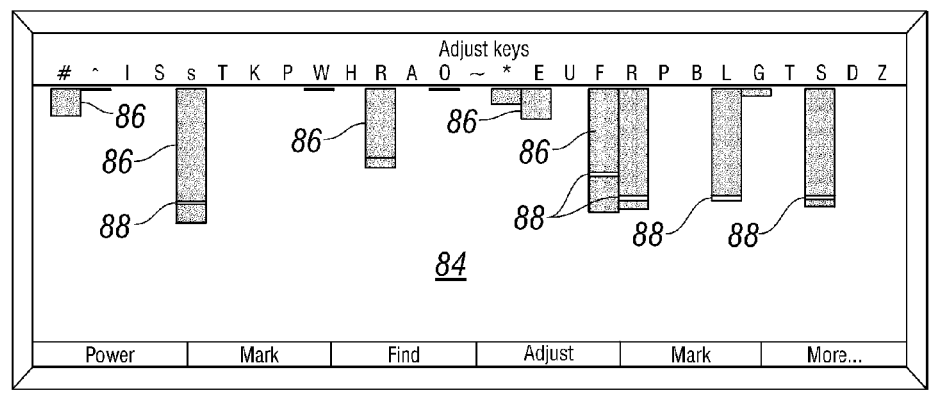
FIG. 16 is a plan view of the exemplary display of FIG. 14 indicating a set of keys pressed, some of which are pressed past their respective registration points.
Figure 17:
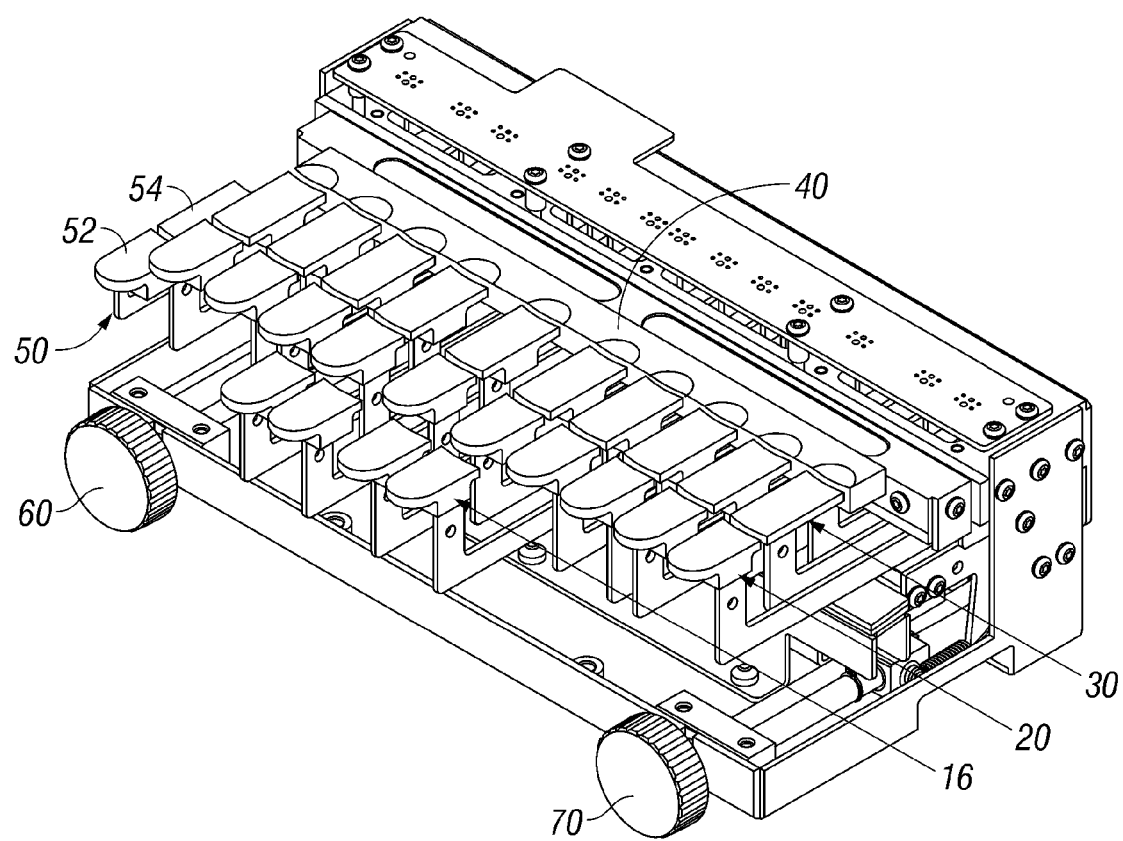
FIG. 17 is a perspective view of the keyboard assembly of FIG. 13.
Figure 20:
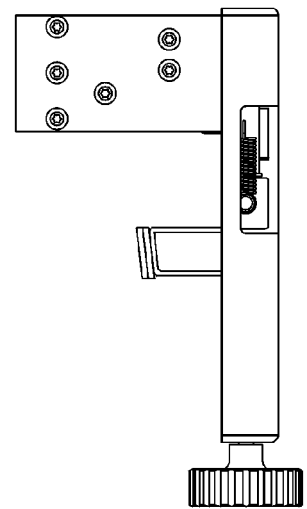
FIG. 20 is a right side elevational view of a portion of the keyboard assembly of FIG. 17.
Figure 18:
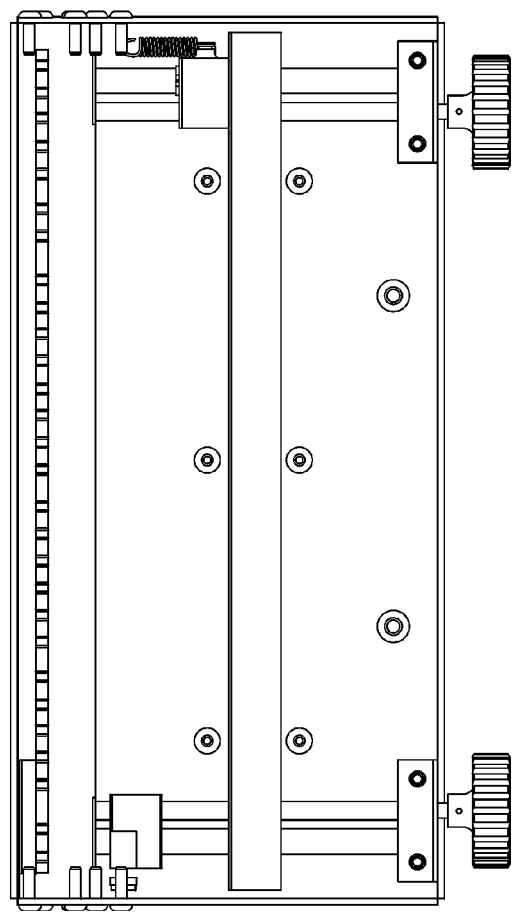
FIG. 18 is a plan view of a portion of the keyboard assembly of FIG. 17.
Figure 19:
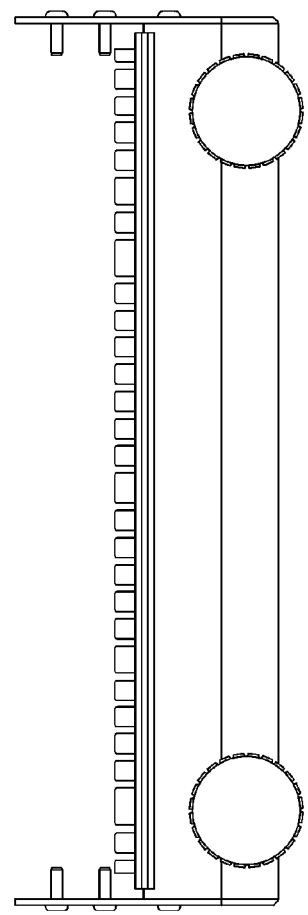
FIG. 19 is a front elevational view of a portion of the keyboard assembly of FIG. 17.
Figure 21:
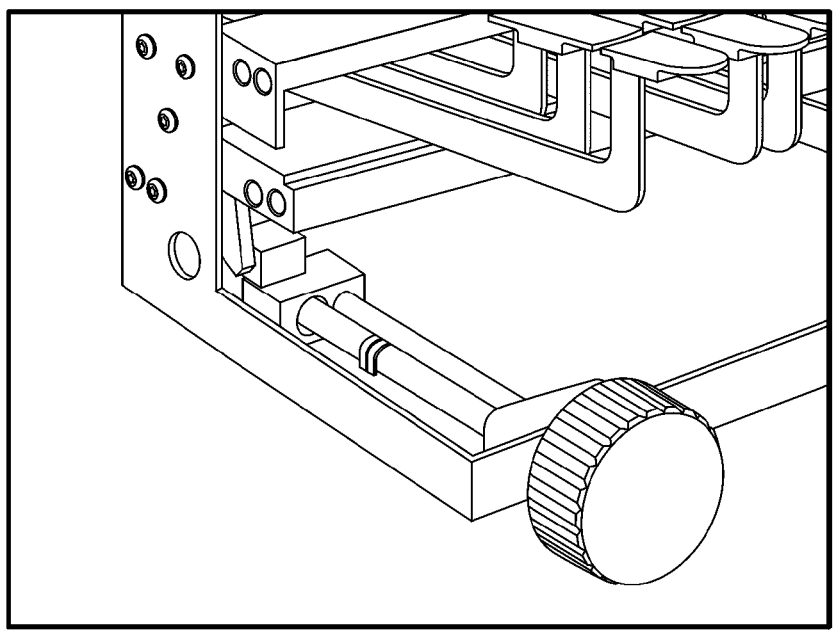
FIG. 21 is a fragmentary, perspective view of the keyboard assembly of FIG. 13 from the front left corner.

In FIG. 16, to the right of a display screen 80, there is a display actuator 82 in the form of a scroll wheel. This wheel 82 can be used to scroll shorthand notes, scroll English text, or adjust the registration point of the individual keys. It is this wheel 82 that assists the user to easily adjust a sensitivity of any key "on-the-fly."

FIG. 14 illustrates an exemplary electronic display pattern 84 for twenty-seven keys in each of the rows 16, 20, 30, 40, 50. When the writer 1 is placed into an electronic adjustment mode, for example, this exemplary pattern 84 is displayed. As a key is depressed, "H" in the example shown, a key depression indicator 86, for example, a vertical bar, drops down from the top of the pattern 84. The farther down the key is pressed, the further the bar 86 extends from the top of the pattern 84. Colors can be used to assist the user in determining whether or not a particular key is depressed beyond its then-set registration point. For example, the bar 86 can be blue in color until it extends to a point that corresponds to the current registration point for that key. At the point in time when this registration point is reached, the bar 86 will turn green in color, for example. Whether the key is pressed or not, a registration indicator 88, such as a red line, for example, can be used to mark the exact registration point for that particular key. When the key is released, the registration indicator 88 can be set to remain on the display pattern 84. This representation of the registration point as a red line 88 can be moved up or down using the scroll wheel 82, for example. Moving the line 88 upwards increases the sensitivity of the key—the registration point is made to occur earlier in the stroke. Moving the line 88 downwards decreases the sensitivity of the key to have the registration point occur later in the stroke.

Figure 15:
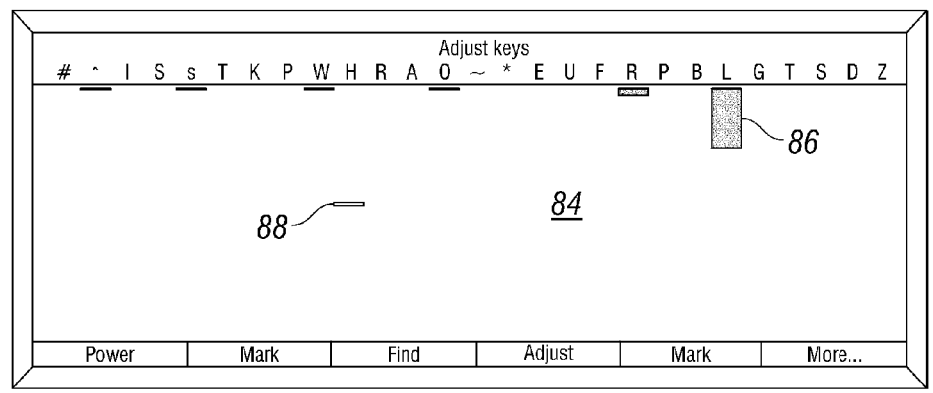
FIG. 15 is a plan view of the exemplary display of FIG. 14 indicating a single key insufficiently pressed to register.

FIG. 15 illustrates a key depression indicator 86 for the key corresponding to "L" in the form of a blue bar descending from the top of the pattern 84. This key has not yet reached the corresponding registration point and, therefore, the red line 88 is not visible. It is noted that six other keys each show small blue bars, indicating that some force is being placed upon these six keys as the "L" key is being depressed. It is further noted that a red line 88 appears on the display pattern 84 under the "H" key depression indicator. In this exemplary registration embodiment, the red line 88 represents the registration point of a key that was last pressed far enough to be registered. When the blue bar of the "H" key turns green, the red line 88 for the other key will disappear and the "H" key's registration line 88 will appear.

Thus, after a particular key is adjusted to the user's satisfaction, the user can simply press another key for sensitivity adjustment. As soon as the newly-pressed key reaches its registration point, the red line 88 will appear for that key, and the former red line will be removed from the display pattern 84. In another optional embodiment, the writer 1 can be programmed to display the registration points of all keys simultaneously. If desired, an alternative embodiment can include an automatic depth-sensing routine included in the microprocessor programming. A test stenographic dictation would be typed by the user and the machine would sense the user's key depth level to obtain registration and, based upon that sensed data, the program would set the sensitivity for each key independently. For example, the sensitivity could be set at 75% of the actual user's stroke throw. This setting could be done at any time, whether before dictation when the user is not tired, or during dictation after the user has some measure of fatigue. This sensitivity setting process could be set by the user and repeated at any time. Alternatively, the machine could be programmed to perform an auto-setting program at 30 minute intervals during active dictation.

FIG. 16 illustrates the display pattern 84 where several keys are being depressed simultaneously. In this example, five keys have reached or passed the respective registration point and are, therefore, displaying green bars 86—registration points for each key are marked by each of the five corresponding red lines 88. Also shown in FIG. 16 are four blue bars 86 in the display pattern 84. These blue bars 86 represent keys that have been depressed somewhat but have not passed their respective registration points. This latter information is very instructive to the user. For example, if the user desired to actually press one or more of these keys but one or more did not register, then those keys should be adjusted to be more sensitive. Alternatively, if the user did not desire to press one or more of these keys, then those keys should be adjusted to be less sensitive so that no indicator 86 appears, which could, possibly, corrupt accurate transcription.

Similarly, it may be desirable to adjust those keys that indicated a depression merely up to the registration point 88. If the red line 88 is located very near the end of the green bar 88, then it would indicate to the user that the user is just barely pressing the key correctly. To prevent a non-registered stroke from occurring in the future, the user would adjust this key to be slightly more sensitive. Conversely, if the red bar 88 appears very high up within a green bar (see key "F" for example), the user might wish to adjust that key for less sensitivity, by using the scroll wheel, to lessen the work needed for the user's finger to adequately register that key.

Figure 22:
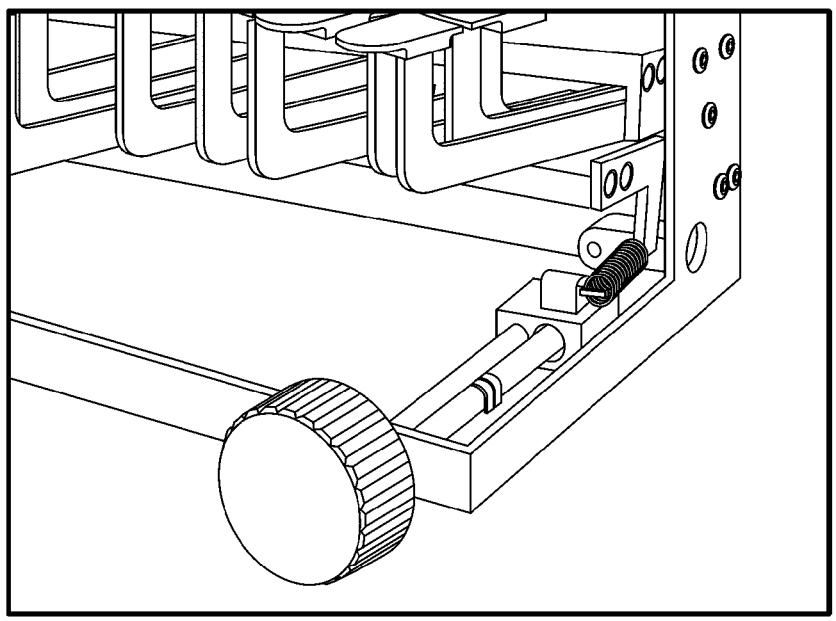
FIG. 22 is a fragmentary, perspective view of the keyboard assembly of FIG. 13 from the front right corner.

FIGS. 18 to 21 show detail of the keyboard 10 and of the depth-of-stroke 60 and the tension adjustment 70 mechanisms. FIGS. 22 and 23 are enlarged views of the depth-of-stroke adjustment mechanism 60 and the tension adjustment mechanism 70, respectively.

Other possible uses for the keystroke device 10 according to the invention include musical instruments. In one example, the volume of the note would increase or decrease based upon a level of the output signal. In another example, the volume of the note would increase dependent upon a rate of change of the signal (velocity).

We claim:

1. A stenographic device comprising:
   a plurality of keys making up a standard stenographic keyboard, each key having a resting position, a depressed position, and a range of depression positions between the resting position and the depressed position;
   a display; and
   a processor communicatively coupled to the display and the plurality of keys, the processor operable to cause the display to graphically show, for at least one of the keys, a depression indicator of a current one of the range of depression positions between the resting position and the depressed position.

2. The stenographic device according to claim 1, further comprising:
   a memory communicatively coupled to the processor,
   wherein the processor is further operable to:
      store a key-press registration point associated with one of the keys in the memory; and
      cause the display to display a registration indicator corresponding to the stored registration point of the one key.

3. The stenographic device according to claim 2, wherein the processor is further operable to:
   cause the display to graphically show a respective depression indicator of a current one of the depression positions for each of the keys;
   store in the memory a respective key-press registration point for each of the keys; and
   cause the display to display a registration indicator corresponding to the stored registration point of each of the keys.

4. The stenographic device according to claim 2, wherein:
   the registration point is located within the range of depression positions between the resting position and the depressed position;
   the depression indicator is of a first color on the display when the key is at a depression position located between the resting position and the depression position corresponding to the registration point; and
   the depression indicator is of a second color on the display different from the first color when the key is at a depression position located between the depression position corresponding to the registration point and the depressed position.

5. The stenographic device according to claim 2, further comprising:
   a key sensitivity adjuster operable to set the registration point to a new value.

6. The stenographic device according to claim 1, further comprising:
   a speaker communicatively coupled to the processor,
   wherein the processor is operable to communicate to the speaker, and the speaker is operable to broadcast at least one audio signal for the at least one key, indicating a current depressed position of the at least one key.

7. A method for determining key registration settings in a stenographic device, the method comprising:
   receiving information indicating a depression depth of a key on a standard stenographic keyboard, the key having a movement range between a key inactivity high and a key depression low and the depression depth being located within the range between the key inactivity high and the key depression low; and
   displaying on a display of the stenographic device, a graphical representation of the depression depth for the key at a location between the key inactivity high and the key depression low.

8. The method according to claim 7, further comprising:
   defining a registration point for the key as a given depression depth where the key is actuated to register a keystroke in the stenographic device;
   displaying, on the display, a graphical representation of the depression depth range for the key; and
   displaying, on the display, the registration point within the graphical representation of the depression depth range.

9. The method according to claim 8, further comprising:
   displaying the graphical representation of the depression depth in a first color if the current depression depth of the key has not reached the registration point; and
   displaying the graphical representation of the depression depth in second color if the current depression depth of the key has reached or exceeded the registration point.

10. The method according to claim 8, further comprising;
    emitting an audible noise when the current depression depth exceeds the registration point.

11. The method according to claim 8, further comprising:
    displaying the graphical representation of the depression depth after the key returns to the key inactivity high.

12. A method for determining key registration settings in a stenographic device, the method comprising:
    receiving information indicating respective depression depths of keys on a standard stenographic keyboard;

displaying a graphical representation of each depression depth for the keys on a display of the stenographic device along with a graphical representation of a depression depth range for the key;

defining a registration point for each of the keys as a given depression depth where the respective key is actuated to register a stroke of the respective key in the stenographic device, the given depression depth being located within a range between a key inactivity high and a key depression low; and displaying the registration point for each of the keys within the respective graphical representation of the depression depth range.

13. The method according to claim 12, further comprising:

displaying the graphical representation of the depression depth in a first color if the current depression depth of the key has not reached the registration point; and displaying the graphical representation of the depression depth in second color if the current depression depth of the key has reached or exceeded the registration point.

14. A stenographic device, comprising:

a plurality of keys making up a standard stenographic keyboard, each key having a resting position in which the key is in an un-actuated state, a depressed position in which the key is in an actuated state where a key stroke is registered, and a range of depression positions between the resting position and the depressed position;

a display;

a processor communicatively coupled to the display and the plurality of keys for registering the actuation states of the keys; and a memory communicatively coupled to the processor, wherein the processor is operable:
to cause the display to graphically show a respective depression indicator of a current one of the depression positions for each of the keys;
to store in the memory a respective key-press registration point for each of the keys, the registration point being a depression position located within the range of depression positions and indicating when the respective key is in the actuated state; and
to cause the display to graphically show a respective registration indicator corresponding to the stored registration point for each of the keys.

15. The stenographic device according to claim 14, wherein:

the depression indicator is of a first color on the display when the key is at a depression position located between the resting position and the depression position corresponding to the registration point; and the depression indicator is of a second color on the display different from the first color when the key is at a depression position located between the depression position corresponding to the registration point and the depressed position.

16. The stenographic device according to claim 15, wherein the first color is red, the second color is green, and the registration indicator is blue.

17. The stenographic device according to claim 14, further comprising a key sensitivity adjuster operable to set the registration point to a new value.

18. The stenographic device according to claim 14, further comprising a speaker communicatively coupled to the processor, wherein the processor is operable to communicate to the speaker, and the speaker is operable to broadcast at least one audio signal for at least one of the keys to indicate a current depressed position of the at least one key.

* * * * *